United States Patent
Weeber et al.

(10) Patent No.: US 6,897,577 B2
(45) Date of Patent: May 24, 2005

(54) METHODS AND SYSTEM FOR POWER GENERATION

(75) Inventors: Konrad Roman Weeber, Rexford, NY (US); James Michael Fogarty, Schenectady, NY (US); Rebecca Ann Nold, Scotia, NY (US); Richard Nils Dawson, Voorheesville, NY (US); Phillip Lynn Andrew, Simpsonville, SC (US); Harold Edward Miller, Glenville, NY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 10/619,195

(22) Filed: Jul. 14, 2003

(65) Prior Publication Data

US 2005/0012397 A1 Jan. 20, 2005

(51) Int. Cl.⁷ ................................................. H02P 9/00
(52) U.S. Cl. .......................... 290/52; 322/100; 307/68
(58) Field of Search ........................... 290/2, 52, 40 C; 322/44, 100; 307/68

(56) References Cited

U.S. PATENT DOCUMENTS

| | | | |
|---|---|---|---|
| 4,174,483 A | 11/1979 | Vinokurof et al. | 310/52 |
| 4,250,418 A | 2/1981 | Eckels | 310/64 |
| 4,727,724 A | 3/1988 | Intichar et al. | 62/55.5 |
| 4,961,310 A | 10/1990 | Moore et al. | 60/39.182 |
| 5,271,217 A | 12/1993 | Knuijt | 60/39.31 |
| 5,367,245 A * | 11/1994 | Mims | 322/2 R |
| 5,514,915 A * | 5/1996 | Kim et al. | 307/64 |
| 5,548,168 A | 8/1996 | Laskaris et al. | 310/52 |
| 5,672,921 A | 9/1997 | Herd et al. | 310/52 |
| 6,215,202 B1 * | 4/2001 | Luongo et al. | 307/64 |
| 6,216,437 B1 * | 4/2001 | Hepner et al. | 60/773 |
| 6,545,880 B1 * | 4/2003 | Mueller | 363/14 |
| 6,617,738 B2 * | 9/2003 | Dickinson | 310/178 |
| 6,657,321 B2 * | 12/2003 | Sinha | 307/68 |

* cited by examiner

*Primary Examiner*—Nicholas Ponomarenko
(74) *Attorney, Agent, or Firm*—Armstrong Teasdale LLP

(57) ABSTRACT

A method of operating a power generation system and a power generation system are provided. The method includes coupling at least one electrical generator to at least one prime mover, wherein the at least one generator includes at least one of a stator and a rotor wherein at least one of the stator and the rotor includes superconducting windings therein, and coupling at least one cryogenic refrigeration system to the superconducting windings, wherein the at least one cryogenic refrigeration system is coupled in flow communication with the superconducting windings to facilitate reducing an operating temperature of the superconducting windings. The system includes at least one prime mover, at least one electrical generator rotatably coupled to the at least one prime mover, wherein the generator includes at least one of a stator and a rotor wherein at least one of the stator and the rotor includes a plurality of superconducting windings therein, and at least one cryogenic refrigeration system in flow communication with the superconducting windings.

22 Claims, 2 Drawing Sheets

METHODS AND SYSTEM FOR POWER GENERATION

BACKGROUND OF THE INVENTION

This invention relates generally to power plants, and particularly to methods and systems used for power generation.

Thermal power plants use a fuel, such as natural gas, coal, oil, nuclear fuel, or solar or geothermal sources to create a reliable supply of electricity for a power grid. At least some known thermal power plants include at least one power train that includes a synchronous generator coupled together with supporting components that enable the power train to work. More specifically, a prime mover converts thermal energy contained in the fuel into rotational energy, and the generator converts rotational energy to electricity using electromagnetic interaction between a rotating winding, known as a field winding, and a stationary winding, known as an armature winding.

A power transmission system, or power grid, functions using two types of electricity, real power and reactive power. The proportion of real power to reactive power depends on the type of customers on the grid, and on the characteristics of the transmission lines used to transmit the electricity within the grid. Real and reactive power outputs of a generator may be limited by operating temperatures and heat generated due to resistive current losses in various components within the generator. Overheating of the generator may reduce the life expectancy of the components and the generator.

Each component coupled within such an energy conversion system includes an inherent associated power loss. For example, a synchronous electrical generator generates heat due to resistive current losses in stator windings and rotor windings. To produce a desired amount of electricity, an increased fuel flow is required to compensate for the power loss associated with the components within the energy conversion system. However, the increased fuel consumption results in additional fuel cost and emissions, which may include gaseous and particulate byproducts of combustion, and waste heat.

BRIEF DESCRIPTION OF THE INVENTION

In one aspect, a method of operating a power generation system is provided. The method includes coupling at least one electrical generator to at least one prime mover, wherein the at least one generator includes at least one of a stator and a rotor including superconducting windings therein, and coupling at least one cryogenic refrigeration system to the superconducting windings, wherein the at least one cryogenic refrigeration system is coupled in flow communication with the superconducting windings to facilitate reducing an operating temperature of the superconducting windings.

In another aspect, a power generation system is provided. The system includes at least one prime mover, at least one electrical generator rotatably coupled to the at least one prime mover, wherein the generator includes at least one of a stator and a rotor including a plurality of superconducting windings therein, and at least one cryogenic refrigeration system in flow communication with the superconducting windings to facilitate reducing an operating temperature of the superconducting windings.

In yet another aspect, a power generation system is provided. The system includes at least one prime mover, at least one electrical generator rotatably coupled to the at least one prime mover, at least one generator step-up transformer (GSU) including at least one superconducting winding therein and electrically coupled to the electrical generator output, and at least one cryogenic refrigeration system in flow communication with the superconducting windings to facilitate reducing an operating temperature of the superconducting windings.

DETAILED DESCRIPTION OF THE INVENTION

Figure 1:
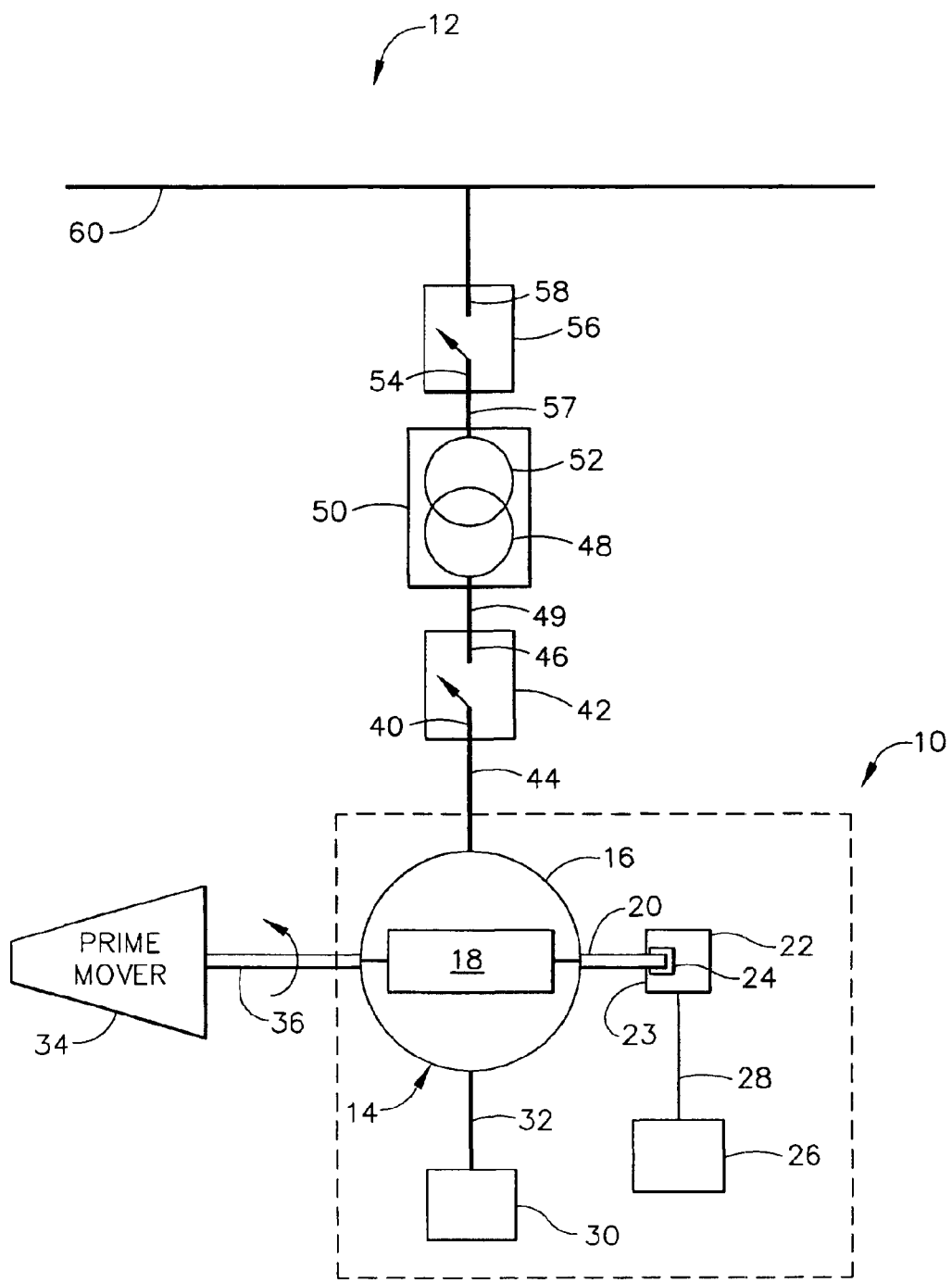
FIG. 1 is a schematic diagram of a superconducting generator system in an exemplary power plant configuration.

FIG. 1 is a schematic diagram of a superconducting generator system 10 coupled in an exemplary power plant 12 configuration. Superconducting generator system 10 includes a superconducting generator 14 that includes at least one of a superconducting stator 16 and a superconducting rotor 18 that are magnetically coupled together such that rotor 18 is substantially coaxially aligned with stator 16. In an alternative embodiment, superconducting generator 14 is a synchronous condenser. In one embodiment, rotor 18 includes superconducting components and rotor 18 is rotatably coupled at a first end 20 to a known cryogenic fluid coupling 22. Coupling 22 includes a rotating member 23 that is coupled substantially coaxially to first end 20, and a non-rotating member 24 that is coupled to a stationary foundation (not shown) that facilitates maintaining the alignment between first end 20 and rotating member 23 of coupling 22. Non-rotating member 24 is coupled in flow communication with a first cryogenic refrigeration system 26 though supply and return lines 28 that supply cryogenic liquid or gas to coupling 22, and route cryogenic liquid or gas from coupling 22. More specifically, refrigeration system 26 receives cryogenic liquid or gas from coupling 22 and cools the cryogenic liquid or gas such that cryogenic liquid or gas may be routed back to coupling 22 for distribution within rotor 18.

In one embodiment, stator 16 includes superconducting components and stator 16 is coupled in flow communication with a second cryogenic refrigeration system 30 though supply and return lines 32. Refrigeration system 30 receives cryogenic liquid or gas from stator 16 and cools the cryogenic liquid or gas such that cryogenic liquid or gas may be resupplied to stator 16 for distribution within stator 16. In the exemplary embodiment, cryogenic refrigeration systems 26 and 30 are independent systems. In an alternative embodiment, cryogenic refrigeration systems 26 and 30 are a single unit supplying both stator 16 and rotor 18.

Rotor 18 is also rotatably coupled to a prime mover 34 through shaft 36. In one embodiment, prime mover 34 is a turbine assembly, such as but not limited to a gas turbine, a steam turbine, a hydroturbine, and/or a wind turbine. In another embodiment, prime mover 34 is an internal combustion engine assembly. In still another embodiment, prime mover 34 is a combination of turbine assemblies, internal combustion engine assemblies, fuel cells, and/or solar collectors. In the exemplary embodiment, power plant 12, is illustrated as a single shaft power train wherein prime mover 34 is coupled substantially coaxially with rotor 18. In another embodiment, any portion of prime mover 34 may be coupled to rotor 18 via a power transmission device (not shown), such as, for example, a hydraulic coupling or a gear arrangement. Although prime mover 34 is illustrated and described herein as a single engine in the exemplary embodiment, it will be understood that prime mover 34 may be any suitable combination of engines capable of delivering rotary power to a shaft. For example, in combinations known as, but not limited to gas and steam turbines in simple cycle, combined cycle, tandem, cross compound, and dual-flow combinations.

Stator 16 is electrically coupled to a line side 40 of a generator output breaker 42 through conductors 44. A load side 46 of breaker 42 is electrically coupled to a first winding 48 of a generator step-up transformer (GSU) 50 through conductors 49. In an alternative embodiment, transformer 50 is a superconducting transformer that is coupled in flow communication with a cryogenic fluid refrigeration system (not shown). In another alternative embodiment, conductors 44 are electrically coupled directly to GSU 50 and are cryogenically cooled superconducting conductors. A second winding 52 of transformer 50 is electrically coupled to a line side 54 of a high voltage breaker 56 through conductors 57. A load side 58 of breaker 56 is electrically coupled to a switchyard bus 60. In an alternative embodiment, load side 58 is electrically coupled to a regional high voltage electrical grid 60.

In operation, cryogenic refrigeration systems 26 and 30 supply cryogenic liquid or gas to superconducting components of stator 16 and rotor 18. The liquid or gas cooled by refrigeration system 26 is routed to coupling 22 through lines 28. Coupling 22 transfers cryogenic liquid or gas from stationary member 24 to rotating member 23 through rotor first end 20. Cryogenic liquid or gas is then channeled through rotor 18 to cool components within rotor 18. The spent cryogenic liquid or gas is then returned to coupling 22 and routed to refrigeration system 26 wherein heat removed from rotor 18 is released to a heat sink.

Liquid or gas cooled by refrigeration system 30 is channeled to stator 16 through lines 32. More specifically, cryogenic liquid or gas is channeled through stator 16, if superconducting, to cool components within stator 16 and the spent cryogenic liquid or gas is returned to refrigeration system 30, wherein heat removed from stator 16 is released to the heat sink. In the exemplary embodiment, an operating temperature of stator 16 and rotor 18 components is reduced by the cryogenic liquid or gas to a range of about twenty degrees Kelvin to about seventy degrees Kelvin. Components of stator 16 and rotor 18 that exhibit superconducting properties while operating in such a temperature range are known as high temperature superconductors. In contrast, components that exhibit superconducting properties while operating in a range of about two degrees Kelvin to about five degrees Kelvin are known as low-temperature superconductors.

Prime mover 34 supplies rotational power to superconducting generator system 10 for rotating rotor 18 within stator 16. A magnetic field generated by current flow through windings positioned on rotor 18, induces a voltage in windings positioned on stator 16. Because at least one of the stator windings and the rotor windings are made of a superconducting material, the windings exhibit substantially zero resistance to electrical current flow, and subsequently generate approximately zero heat due to ohmic $I^2R$ losses in the conductors of the windings. In the exemplary embodiment, stator 16 and rotor 18 each include superconducting components. In an alternative embodiment, stator 16 includes superconducting components and rotor 18 includes conventional components. In a further embodiment, rotor 18 includes superconducting components and stator 16 includes conventional components.

A voltage induced in stator 16 drives a current flow through conductors 44 to breaker 42. Breaker 42 is operable to disconnect conductors 44 from conductors 46. In an alternative embodiment, breaker 42 is not used and conductors 44 are coupled directly to GSU 50. GSU 50 steps the voltage on conductors 49 from a generated voltage to a transmission voltage. For example, In one embodiment, generated voltage is approximately equal to twenty kilovolts, and a transmission voltage is approximately equal to three hundred and forty five kilovolts. Transmission voltage is transmitted from GSU 50 to high voltage breaker 56 through conductors 57. Breaker 56 is operable to disconnect conductors 57 from switchyard bus 60.

Figure 2:
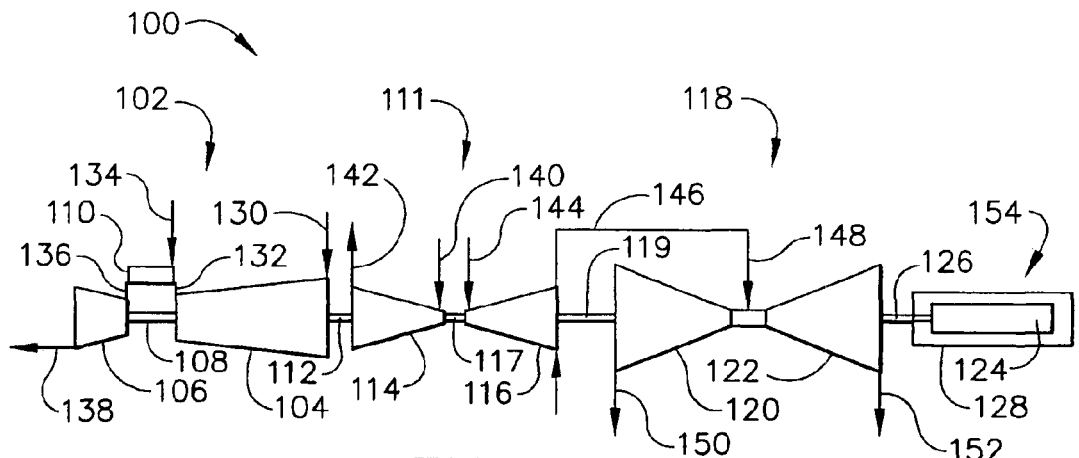
FIG. 2 is a schematic diagram of an exemplary power plant configuration that may be used with the superconducting generator system shown in FIG. 1.

FIG. 2 is a schematic diagram of an exemplary power plant configuration 100 that may be used with the superconducting generator system 10. Power plant configuration 100 includes an expansion turbine engine 102 that includes a compressor 104 coaxially coupled to an expansion turbine 106 through a shaft segment 108, and a combustor 110 coupled in flow communication between compressor 104 and gas turbine 106. A high-pressure/intermediate-pressure (HP/IP) turbine 111 is coaxially coupled to compressor 104 through a shaft segment 112. HP/IP turbine 111 includes a high-pressure (HP) turbine section 114 coupled coaxially to an intermediate-pressure (IP) turbine section 116. HP turbine section 114 and IP turbine section 116 are rotatably coupled such that their respective first stages are coupled together through a shaft segment 117.

IP turbine section 116 is coaxially coupled to a dual-flow/opposed-flow low-pressure (LP) turbine 118 through shaft segment 119. LP turbine 118 includes a first section 120 that is coaxially coupled to a second section 122 in an opposed-flow configuration. LP turbine 118 is coaxially coupled to a superconducting generator rotor 124 through shaft segment 126. Superconducting generator rotor 124 is magnetically coupled to a superconducting generator stator 128. In the exemplary embodiment, shaft segments 108, 112, 117, 119, and 126 are coupled coaxially to prime movers 106, 104, 114, 116, 120, 122 to form a single primary shaft. In other embodiments, prime movers are non-coaxially coupled together using power transfer devices, speed regulating devices or gear units.

In operation, combustion air is drawn into an inlet 130 of compressor 104 and is channeled through compressor 104. Compressed combustion air 132 exits compressor 104 and enters combustor 110 wherein compressed combustion air 132 is mixed with fuel 134. The fuel/air mixture is ignited, creating exhaust gases 136 which, are routed to gas turbine 106 for rotating turbine shaft segment 108. Depleted exhaust gases 138 exit gas turbine 106 and enter a heat removal process (not shown). In one embodiment, the heat removal process is a heat recovery steam generator (HRSG, not shown). In another embodiment, the heat removal process is an exhaust stack wherein depleted exhaust gases 138 are liberated to atmosphere through a stack arrangement.

In the exemplary embodiment, within HP/IP turbine 111 HP section 114 is coupled coaxially to IP section 116 in an opposed-flow configuration. As such, steam entering each turbine section 114 and 116, enters near a center of HP/IP turbine 111 and flows through each respective turbine in a opposite flow direction. More specifically, high pressure steam from, for example, a fired boiler or a HRSG enters HP section 114 through a high pressure steam inlet 140 and the high pressure steam is channeled through HP section 114. Depleted steam exits HP section 120 through HP steam outlet 142 and is directed to, for example, but not limited to, a reheat section of a fired boiler, a reheat boiler or a HRSG (not shown).

Reheated (RH) steam is then directed back to HP/IP turbine 111 and enters IP section 116 through intermediate pressure steam inlet 144. Depleted steam exits IP section 116 through IP steam outlet 146 and is directed to LP turbine 118. In the exemplary embodiment, LP turbine 118 is configured as a dual-flow/opposed-flow turbine. Accordingly, LP turbine 118 includes a first section 120 and a second segment 122 coupled coaxially together such that a first stage of each segment 120 and 122 is coupled together between them. As described above with reference to the HP/IP turbine configuration, relatively low pressure steam from IP section 116 enters LP turbine 118 near a center inlet 148 of LP turbine 118 and is directed in opposite directions through both LP sections 120 and 122. Exhausted steam from LP turbine 118 exits LP turbine 118 through exhaust outlets 150 and 152 and is directed to a condenser (not shown). Work extracted from steam or gas in each of turbines 106, 114, 116, 120, and 122 provides rotational power through shaft segment 126 to rotate rotor 124 within stator 128 of a superconducting generator 154.

Figure 3:
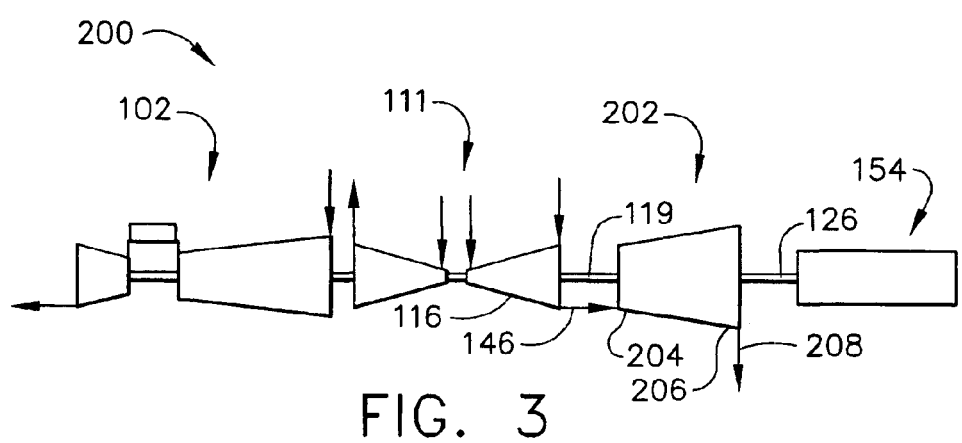
FIG. 3 is a schematic diagram of an alternative embodiment of a power plant configuration that may be used with superconducting generator system shown in FIG. 1.

FIG. 3 is a schematic diagram of an alternative embodiment of a power plant configuration 200 that may be used with superconducting generator system 10. Power plant configuration 200 is substantially similar to power plant configuration 100 (shown in FIG. 2) and components of power plant configuration 200 that are identical to components of power plant configuration 100 are identified in FIG. 3 using the same reference numerals used in FIG. 2. Accordingly, power plant configuration 200 includes gas turbine 102, HP/IP turbine 111, and superconducting generator 154. Additionally, power plant configuration 200 includes a single-flow low-pressure (LP) turbine 202. A first stage end 204 of LP turbine 202 is coupled to shaft segment 119 and a last stage end 206 of LP turbine 202 is coupled to shaft segment 126.

In operation, power plant configuration 200 operates similarly to power plant configuration 100. Depleted steam exits IP section 116 through IP steam outlet 146 and is directed to LP turbine 202 wherein the steam is channeled through LP turbine 202. Exhausted steam from LP turbine 202 exits LP turbine 202 through exhaust outlet 208 and is channeled to a condenser (not shown). Work extracted from steam or gas in each of turbines 102, 111, and 202 provides rotational power through shaft segment 126 to superconducting generator 154.

Figure 4:
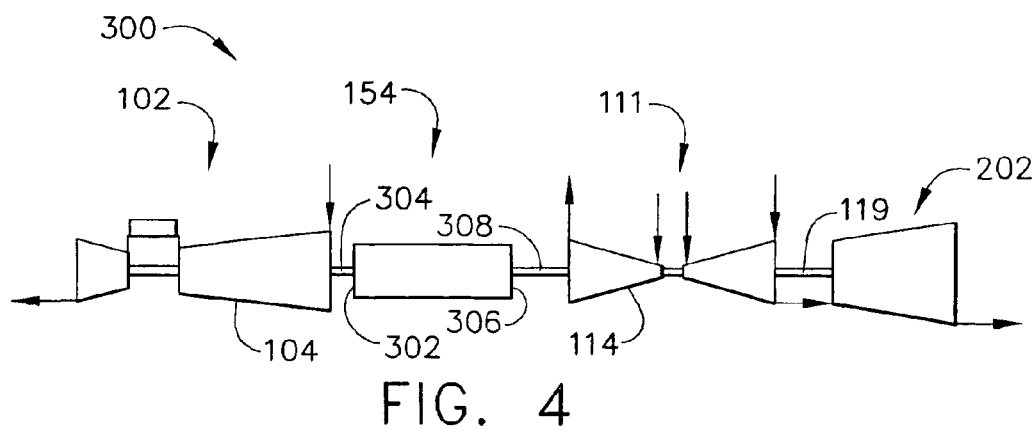
FIG. 4 is a schematic diagram of a further alternative embodiment of a power plant configuration that may be used with superconducting generator system shown in FIG. 1.

FIG. 4 is a schematic diagram of a further alternative embodiment of a power plant configuration 300 that may be used with superconducting generator system 10. Power plant configuration 300 is substantially similar to power plant configuration 200 (shown in FIG. 3) and components of power plant configuration 300 that are identical to components of power plant configuration 200 are identified in FIG. 4 using the same reference numerals used in FIG. 3. Accordingly, power plant configuration 300 includes gas turbine 102, HP/IP turbine 111, LP turbine 202 and superconducting, generator 154. A first end 302 of superconducting generator 154 is coaxially coupled to compressor 104 through shaft segment 304. A second end 306 of superconducting generator 154 is coaxially coupled to HP turbine section 114 through shaft segment 308.

In operation, power plant configuration 300 operates similarly to power plant configuration 200. Work extracted from steam or gas in each of turbines 102, 111, and 202 provides rotational power through shafts 304 and 308 to superconducting generator 154.

Additional variations of an ordering of prime movers on one or more shafts coupled, to a superconducting generator are contemplated. For example, an internal combustion engine, such as, but not limited to a diesel engine may be used to replace the turbines described herein. Moreover, the exhaust gases from at least one prime mover coupled to the primary shaft of a power plant configuration, or a heat rendering process independent of the power plant configuration, such as, but not limited to geothermal sources, solar collectors, or an exothermic industrial process, may be used to supply heat to a HRSG, which in turn may then supply steam to any combination of steam turbines coupled to the primary shaft or other shafts in the power plant configuration, or to a process independent of the power plant configuration.

The above-described power plant configurations are cost effective and highly reliable. Each power plant configuration includes at least one prime mover coupled to a superconducting generator through a primary shaft. The superconducting generator includes at least one superconducting component. The superconducting components facilitate improving the power plant efficiency through a reduction in generator losses, reducing the amount of fuel consumed by the power plant to produce electric power, reducing pollution emissions from the power plant, increasing the reactive and real power capability of a power plant by removing the field heating limit in the generator and improving the thermal capability of the armature winding, and improving the static and dynamic stability of electric power plants through the use of superconducting generators that include a smaller synchronous reactance than conventional generators. Additionally, the use of superconducting components facilitates reducing aging effects of generator winding and core thermal cycling, improving a short-term overload capability of the generator and the power plant, increasing a short term negative sequence capability of the generator and the power plant, and reducing a foot print size of the generator and the physical power plant. As a result, the described power plant configurations facilitate electrical energy generation in a cost effective and reliable manner.

Exemplary embodiments of power plant configurations are described above in detail. The configurations are not limited to the specific embodiments described herein, but rather, components of the configuration may be utilized independently and separately from other components described herein. Each power plant configuration component can also be used in combination with other power plant configuration components.

While the invention has been described in terms of various specific embodiments, those skilled in the art will recognize that the invention can be practiced with modification within the spirit and scope of the claims.

What is claimed is:

1. A method of operating a power generation system comprising:

coupling at least one electrical generator to at least one prime mover, wherein at least one generator includes at least one of a stator and a rotor wherein at least one of the stator and the rotor includes superconducting windings therein; and coupling at least one cryogenic refrigeration system to the superconducting windings, the at least one cryogenic refrigeration system coupled in flow communication with the superconducting windings to facilitate reducing an operating temperature of the superconducting windings.

2. A method in accordance with claim 1 further comprising:

coupling a cryogenic fluid transfer coupling in flow communication with the rotor superconducting windings to route cryogenic fluid to the rotor superconducting windings; and coupling the cryogenic fluid transfer coupling in flow communication with the at least one cryogenic refrigeration system.

3. A method in accordance with claim 1 further comprising:

operating the generator as a synchronous condenser;

coupling the generator, operating as a synchronous condenser, electrically to the power generation system, the synchronous condenser including at least one of superconducting stator windings, and superconducting rotor windings;

coupling the synchronous condenser superconducting windings in flow communication with the at least one cryogenic refrigeration system.

4. A method in accordance with claim 1 wherein coupling at least one electrical generator to at least one prime mover comprises coupling at least one electrical generator to at least one of a turbine assembly, and an internal combustion engine assembly.

5. A method in accordance with claim 4 wherein said method further comprises coupling a steam turbine assembly in flow communication with at least one of a HRSG, a fossil fuel-fired boiler, a waste-fired boiler, a biomass-fired boiler, a geothermal source, a solar source, and a nuclear reactor.

6. A method in accordance with claim 4 wherein coupling at least one electrical generator to at least one prime mover comprises coupling a plurality of prime movers in cross-compound configuration.

7. A method in accordance with claim 4 further comprising:

coupling at least one HRSG to at least one of an exhaust of the at least one prime mover, a solar collector, a geothermal source, an an exothermic industrial process; and transferring heat from the exhaust of the prime mover to the HRSG.

8. A method in accordance with claim 7 further comprising coupling a steam side of the at least one HRSG in flow communication with at least one steam turbine in a combined cycle configuration.

9. A method in accordance with claim 1 wherein coupling at least one electrical generator to at least one prime mover comprises coupling a plurality of prime movers in tandem.

10. A method in accordance with claim 1 wherein coupling at least one electrical generator to at least one prime mover further comprises coupling the at least one electrical generator to a plurality of primary shafts, wherein each shaft is coupled to at least one prime mover.

11. A power generation system comprising:

at least one prime mover;

at least one electrical generator rotatably coupled to said at least one prime mover, said generator comprising at least one of a stator and a rotor wherein at least one of said stator and said rotor comprises superconducting windings therein; and at least one cryogenic refrigeration system in flow communication with said superconducting windings to facilitate reducing an operating temperature of said superconducting windings.

12. A power generation system in accordance with claim 11 wherein said at least one electrical generator further comprises:

a cryogenic transfer coupling coupled to said rotor, said coupling in flow communication with said rotor superconducting windings and said at least one cryogenic refrigeration system.

13. A power generation system in accordance with claim 11 further comprising a synchronous condenser comprising at least one of superconducting stator windings and superconducting rotor windings, said synchronous condenser electrically coupled to said power generation system, said superconducting windings coupled in flow communication with said at least one cryogenic refrigeration system.

14. A power generation system in accordance with claim 11 wherein said at least one prime mover comprises at least one of a turbine assembly and an internal combustion engine assembly.

15. A power generation system in accordance with claim 14 wherein said at least one prime mover comprises a steam turbine in flow communication with at least one of a heat recovery steam generator (HRSG), a fossil fuel-fired boiler, a waste-fired boiler, a biomass-fired boiler, a geothermal source, a solar source, and a nuclear reactor.

16. A power generation system in accordance with claim 11 wherein said at least one prime mover comprises a plurality of prime movers rotatably coupled.

17. A power generation system in accordance with claim 11 wherein said at least one prime mover comprises a plurality of prime movers in a coupled cross-compound configuration.

18. A power generation system in accordance with claim 11 further comprising at least one HRSG, said at least one prime mover is coupled in flow communication with said HRSG.

19. A power generation system in accordance with claim 18 wherein a steam side of said at least one HRSG is coupled in flow communication with at least one steam turbine in a combined cycle configuration.

20. A power generation system in accordance with claim 11 that further comprises a plurality of shafts, wherein at least one of said plurality of shafts is coupled to a superconducting generator, and at least one of said plurality of shafts is coupled to at least one of said at least one prime movers.

21. A power generation system in accordance with claim 11 that further comprises at least one generator step-up transformer (GSU) comprising at least one superconducting windings therein.

22. A power generation system comprising:

at least one prime mover;

at least one electrical generator rotatably coupled to said at least one prime mover;

at least one GSU comprising at least one superconducting winding therein, said GSU electrically coupled to said electrical generator output; and at least one cryogenic refrigeration system in flow communication with said superconducting windings to facilitate reducing an operating temperature of said superconducting windings.

* * * * *

UNITED STATES PATENT AND TRADEMARK OFFICE
CERTIFICATE OF CORRECTION

PATENT NO. : 6,897,577 B2
APPLICATION NO. : 10/619195
DATED : May 24, 2005
INVENTOR(S) : Weeber et al.

It is certified that error appears in the above-identified patent and that said Letters Patent is hereby corrected as shown below:

In Claim 7, column 7, line 28, delete "an an exothermic" and insert therefor -- an exothermic --.

Signed and Sealed this

Thirteenth Day of November, 2007

JON W. DUDAS
*Director of the United States Patent and Trademark Office*